(12) United States Patent
Chen

(10) Patent No.: US 6,966,686 B2
(45) Date of Patent: Nov. 22, 2005

(54) SURFACE LIGHT SOURCE DEVICE

(75) Inventor: Mi-Chien Chen, Tu-chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 122 days.

(21) Appl. No.: 10/640,341

(22) Filed: Aug. 12, 2003

(65) Prior Publication Data

US 2004/0090766 A1 May 13, 2004

(30) Foreign Application Priority Data

Nov. 13, 2002 (TW) .............................. 91218162 U

(51) Int. Cl.$^7$ ................................................. F21V 7/04

(52) U.S. Cl. ...................... 362/634; 362/615; 362/629; 349/58

(58) Field of Search ........................... 362/31, 26, 561, 362/634, 615, 629; 349/58

(56) References Cited

U.S. PATENT DOCUMENTS

| | | | |
|---|---|---|---|
| 5,537,296 A | 7/1996 | Kimura et al. | |
| 5,558,420 A | 9/1996 | Oki et al. | |
| 5,815,227 A | 9/1998 | Lee | |
| 6,286,971 B1 * | 9/2001 | Hori | 362/31 |
| 6,309,081 B1 | 10/2001 | Furihata | |
| 6,435,685 B2 * | 8/2002 | Matsushita | 362/31 |
| 6,513,944 B2 | 2/2003 | Chou | |
| 6,545,732 B2 * | 4/2003 | Nakano | 349/58 |
| 2002/0044437 A1 * | 4/2002 | Lee | 362/31 |
| 2002/0131261 A1 * | 9/2002 | Inui et al. | 362/31 |

* cited by examiner

Primary Examiner—Thomas M. Sember
Assistant Examiner—James W Cranson, Jr.
(74) Attorney, Agent, or Firm—Wei Te Chung

(57) ABSTRACT

A surface light source device used in an LCD includes a panel-shaped light guide plate (200), a pair of light sources (100) for emitting light, and two pairs of light source holders (300). The light sources are installed adjacent to two end surfaces of the light guide plate. The light source holders are integrally formed with the light guide plate for receiving and fixing two end portions of each light source respectively.

16 Claims, 2 Drawing Sheets

SURFACE LIGHT SOURCE DEVICE

BACKGROUND OF THE INVENTION

1. Field of the Invention

The invention relates to a surface light source device, and more particularly to a backlight for a liquid crystal display (LCD) that provides improved assembly efficiency and better overall light characteristics.

2. Description of the Related Art

As a display device, a liquid crystal display (LCD) is not luminous itself and generally requires a backlight device for illumination. Accordingly, performance of the LCD is greatly dependent on the backlight device employed.

U.S. Pat. No. 6,513,944 issued to Chou discloses a conventional backlight device. FIG 1A of the Chou patent shows that this conventional back light device comprises a first frame 1, a diffuser 2, a light guide 3, a reflection sheet 4, a second frame 5, a back plate 6 and two lamp assemblies 7. FIG. 1B of the Chou patent shows each lamp assembly 7, including two fluorescent tubes 72, a tube guard 71 covering the fluorescent tubes 72, and a holder 73 for fixing the fluorescent tubes 72 in the tube guard 71.

FIG. 4A of the Chou patent shows an assembly of the light guide 3, the reflection sheet 4 (not visible), the second frame 5 and the back plate 6. The diffuser 2 and the first frame 1 are not included. The lamp assemblies 7 are inserted from an open end 57 of a groove 51 of the second frame 5 to a closed end 56 thereof. A screw 62 (shown in FIG. 5 of the Chou patent) is screwed into a hole 64 provided through the back plate 6 to fasten each lamp assembly 7 in the groove 51.

It is important that a distance between the fluorescent tubes 72 of the lamp assemblies 7 and the light guide 3 be accurately maintained at a designed distance, otherwise: (a) the light emitted from the upper portion and lower portion of the light guide 3 will be too strong due to the fluorescent tubes 72 being too close to the light guide 3, or (b) the light emitted from the upper portion and lower portion of the light guide 3 will be too weak due to the fluorescent tubes 72 being too far away from the light guide 3. In summary, if a relative position of the light guide 3 and the fluorescent tubes 72 is not accurately kept as designed, the overall performance of the backlight device will be poor.

Also referring to FIG. 5 of the Chou patent, to reliably retain the relative position of the fluorescent tubes 72 and the light guide 3, the prior art back light device needs the second frame 5, the back plate 6, the tube guard 71, the holder 73 and the screw 62 which screws into the hole 64 cooperating together to fix and establish the relative positions of the fluorescent tubes 72 and the light guide 3. The assembly/disassembly of the back light device is complicated and requires an excessive amount of time since it has so many components. Furthermore, it is difficult to accurately control the relative positions of the light guide 3 and the fluorescent tubes 72 according to their design specifications.

SUMMARY OF THE INVENTION

An object of the present invention is to provide a surface light source device which has a reduced number of components, which is easy to assemble, and which provides reliable illumination performance.

To achieve the above object, a surface light source device comprises a transparent light guide plate, at least a light source for emitting light which is positioned adjacent to a corresponding edge surface of the light guide plate, and at least a light source holder integrally formed with the light guide plate for fixing the light source.

It is preferable that the surface light source device comprises a heat insulated spacer enclosing each end of the light source, and a reflector attached to the light source holder for reflecting light beams emitting from the light source towards the light guide plate. Preferably, an inner surface of the reflector is formed of a highly reflective material.

Other objects, advantages, and novel features of the present invention will become more apparent from the following detailed description when taken in conjunction with the accompanying drawings, in which:

DETAILED DESCRIPTION OF THE INVENTION

Figure 1:
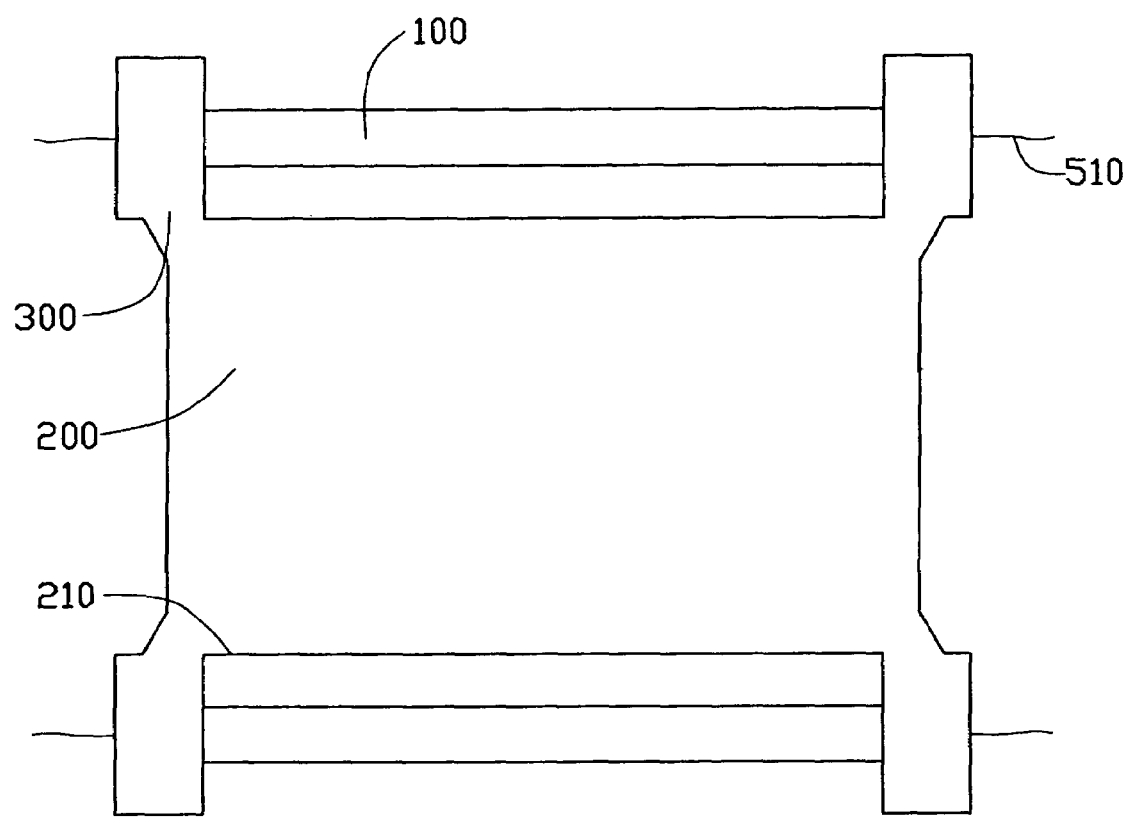
FIG. 1 is a plan view of a surface light source device in accordance with a preferred embodiment of the present invention.

Referring to FIG. 1, a surface light source device for use with an LCD according to an embodiment of the present invention comprises a panel-shaped light guide plate 200, a pair of light sources 100 for emitting light, and two pairs of light source holders 300 integrally formed with the light guide plate 200.

Each light source 100 is preferably a cold cathode fluorescent lamp. The light guide plate 200 is used to guide and to change a propagation direction of incident light from the light sources 100. The light guide plate 200 has two opposite end surfaces functioning as light incident surfaces 210 for receiving light emitted from the light sources 100 into the light guide plate 200. Preferably, each light incident surface 210 is coated with an anti-reflective film (not labeled) to prevent light beams from being reflected back. The light guide plate 200 has an upper surface (not labeled) and a bottom surface (not labeled). The upper surface and/or the bottom surface of the light guide plate 200 can be formed with a pattern of light diffusers (not shown) or V-shaped grooves (not shown) for scattering incident light and improving brightness and uniformity of the light emitted by the surface light source device. The light guide plate 200 is a rectangular plate and is made of a transparent material, such as acrylic resin, poly-carbonate resin, polyvinyl chloride, or glass.

The light source holders 300 are integrally formed with the light guide plate 200 on each corner thereof. The light guide plate 200 and the light source holders 300 can be made by an injection-molding process. Of course, the light source holders 300 may be separately formed and later attached to the light guide plate 200 to form one integrated structure. The light source holders 300 can be formed of a resilient insulated material such as silicon rubber or the like.

Figure 2:
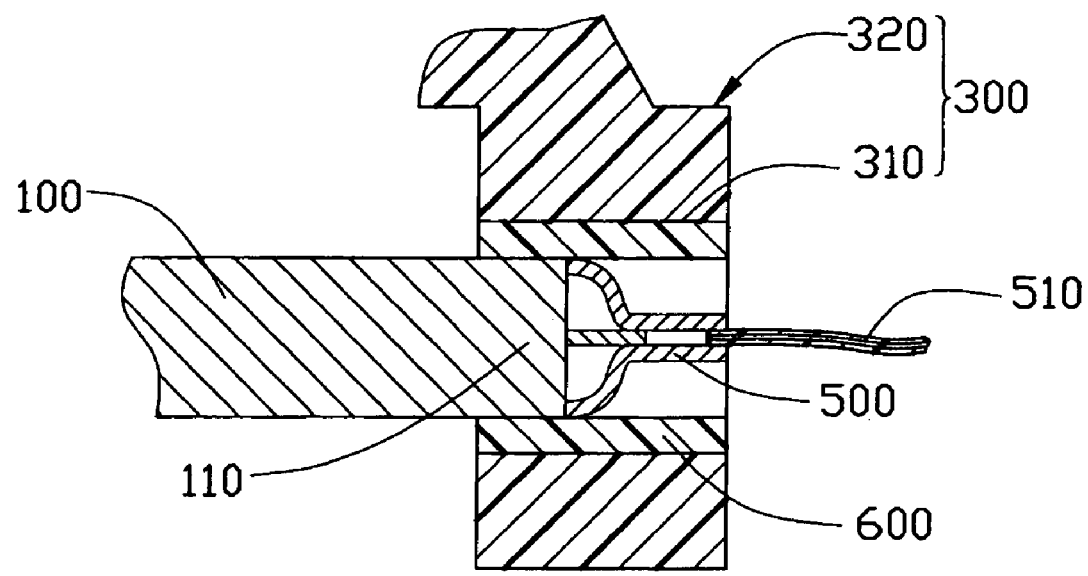
FIG. 2 is an enlarged, cross-sectional view of a light source holder as shown in FIG. 1 with an end portion of a light source therein.

A power supply (not shown) applies voltage to each light source 100 through a pair of electrical wires 510 and a pair of electrical connectors 500, shown in FIG. 2. Each electrical connector 500 is secured in a corresponding light source holder 300 and electrically connects an electrode lead (not labeled) of each side of each light source 100 with the corresponding electrical wire 510. Alternatively, each electrical wire 510 can instead be directly soldered and thus connected to the corresponding electrode lead of the corresponding light source 100. One of the electrical wires 510 electrically connects one end of the light source 100 to a positive pole of the power supply, while the other electrical wire 510 electrically connects the other end of the light source 100 to a negative pole of the power supply.

Also referring to FIG. 2, each light source holder 300 has a hole 310 for receiving and fixing a corresponding end portion 110 of one of the light sources 100. It is preferable that a heat insulated spacer 600 be arranged between an inner surface of each hole 310 and the corresponding end portion 110 of each light source 100. The heat insulated spacer 600 surrounds the end portion 110 of a corresponding light source 100. An inner diameter of the heat insulated spacer 600 is slightly larger in diameter than the end portion 110. A diameter of the hole 310 is slightly greater than an outer diameter of the heat insulated spacer 600.

Figure 3:
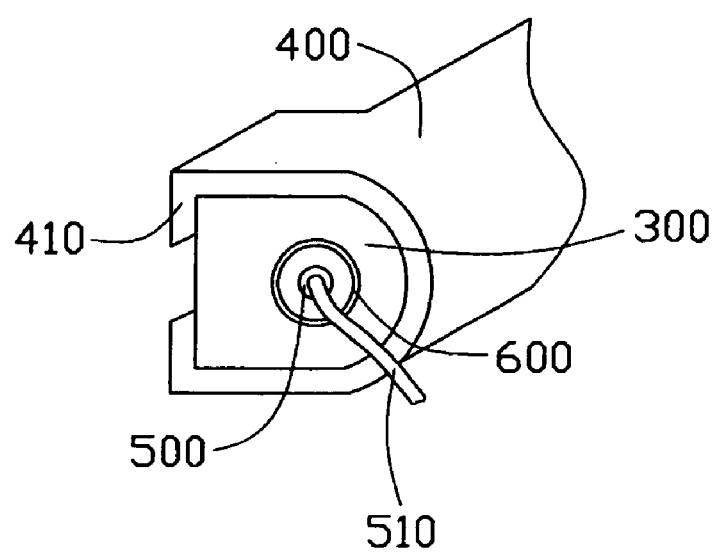
FIG. 3 shows a schematic view of a reflector attached to a light source holder as shown in FIG. 2.

As shown in FIG. 3, each light source 100 has a reflector 400 attached therearound to protect it and to assure efficient utilization of its emitted light beams. Each reflector 400 encloses three sides of its corresponding light source 100. An end (not labeled) of each reflector 400 overlaps and couples with a corresponding light source holder 300, and a pair of flexible locking protrusions 410 are provided at each end of the reflector 400 to attach the reflector 400 to the light source holder 300. The reflector 400 has a U-shaped cross-section, and an inner surface of the reflector 400 is coated with a highly reflective material, such as silver or aluminum, to produce a reflective film, so that light beams coming from the light sources 100 can be efficiently directed into a corresponding light incident surface 210 of the light guide plate 200. The reflector 400 may be made of metal or a highly reflective resin.

In assembly, each electrical wire 510 is soldered or clamped with the corresponding electrical connector 500. First, the heat insulated spacers 600, the electrical connectors 500 and the end portions 110 of each light source 100 are arranged in the holes 310 of the corresponding light source holders 300, and the electrode leads of each light source 100 are fixed in contact with the corresponding electrical connectors 500. Next, the locking protrusions 410 of the reflectors 400 are engaged with side edge surfaces 320 of the light source holders 300, to couple the reflectors 400 to the light source holders 300. Furthermore, the reflectors 400 can be coupled with the light source holders 300 using screws or a bonding process.

In use, the power supply unit (not shown) applies voltage to each light source 100 through the electrical wires 510 and the electrical connectors 500. Some of the light emitted from the light sources 100 is directly incident into the light guide plate 200, and the remaining light is reflected by the reflectors 400 and is then incident into the light guide plate 200. The light incident into the light guide plate 200 is refracted therein and is emitted from the upper surface thereof. As in any conventional surface light source device, a reflecting plate (not shown) and a diffuser plate (not shown) are respectively bonded to the rear side and the front side of the light guide plate 200 by appropriate means in order to get better illumination characteristics from the surface light source device according to the present invention.

As described above, since each light source 100 is fixed by the light source holders 300, which are integrated with the light guide plate 200, the relative positions of the light sources 100 and the light guide plate 200 are more easily controlled and accurately maintained according to their design specifications. Furthermore, fewer parts are required in the surface light source device, which facilitates assembly and disassembly. In addition, the heat insulated spacers 600 are arranged between the inner surfaces of the holes 310 and the end portions 110 of each light source 100, thereby preventing heat-produced deterioration of the light guide plate 200 due to heat generated by the light sources 100.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A surface light source device, comprising:
   a transparent light guide plate;
   at least a light source for emitting light, positioned adjacent to a corresponding edge surface of the light guide plate; and
   light source holders provided at corners of light guide plate for fixing the light source;
   wherein, the light source holders and the light guide plate combine into one assembly.

2. The surface light source device as described in claim 1, wherein the light source holders are made of silicon rubber.

3. The surface light source device as described in claim 1, wherein the light source holders are integrated with the light guide plate by an injection-molding process.

4. The surface light source device as described in claim 1, wherein the light source holders are attached to the light guide plate.

5. The surface light source device as described in claim 1, further comprising at least a reflector coupling with the light source holders and enclosing a corresponding light source on three sides.

6. The surface light source device as described in claim 5, wherein the reflector has at least a protrusion for engaging with at least an edge of one of the corresponding light source holders.

7. The surface light source device as described in claim 5, wherein the reflector is attached to the corresponding light source holders using screws or by bonding.

8. The surface light source device as described in claim 1, wherein each light source holder has a hole for receiving an end of the light source.

9. The surface light source device as described in claim 8, wherein a heat insulated spacer is installed between an inner surface of each hole and a corresponding end of the corresponding light source, an inner diameter of the heat insulated spacer is slightly greater than a diameter of the end of the light source, and a diameter of the hole is slightly greater than an outer diameter of the heat insulated spacer.

10. A surface light source device, comprising:
    a transparent light guide plate;
    at least a light source for emitting light, positioned adjacent to a corresponding edge surface of the light guide plate; and
    a plurality of light source holders, each light source holder being provided at a respective corner of the light guide plate;
    wherein, the light source holders are integrally formed with the light guide plate by an injection-molding process.

11. The surface light source device as described in claim 10, wherein the light source holders are made of silicon rubber.

12. The surface light source device as described in claim 10, wherein each light source holder has a hole for receiving a corresponding end of a corresponding light source.

13. The surface light source device as described in claim 12, wherein a heat insulated spacer is installed between an inner surface of each hole and a corresponding end of the corresponding light source, an inner diameter of the heat insulated spacer is slightly greater than a diameter of the end of the light source, and a diameter of the hole is slightly greater than an outer diameter of the heat insulated spacer.

14. The surface light source device as described in claim 10, further comprising at least a reflector coupling with the light source holders and enclosing a corresponding light source on three sides.

15. The surface light source device as described in claim 14, wherein the reflector has at least a protrusion for engaging with at least an edge of one of the corresponding light source holders.

16. The surface light source device as described in claim 14, wherein the reflector is attached to the corresponding light source holders using screws or by bonding.

\* \* \* \* \*